United States Patent
Young et al.

(10) Patent No.: US 9,371,085 B2
(45) Date of Patent: Jun. 21, 2016

(54) CART CONTROL SYSTEMS AND METHODS FOR CONTROLLING CART CASTER DIRECTION

(71) Applicant: The Boeing Company, Seal Beach, CA (US)

(72) Inventors: Stephen Michael Young, Mill Creek, WA (US); Carl Aaron Davison, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 14/270,577

(22) Filed: May 6, 2014

(65) Prior Publication Data

US 2015/0321761 A1 Nov. 12, 2015

(51) Int. Cl.
| | |
|---|---|
| B62B 3/14 | (2006.01) |
| B60B 1/00 | (2006.01) |
| B62B 5/04 | (2006.01) |
| B62B 3/00 | (2006.01) |
| B64D 11/00 | (2006.01) |
| G07F 7/06 | (2006.01) |

(52) U.S. Cl.
CPC ............... *B62B 5/0466* (2013.01); *B62B 3/008* (2013.01); *B62B 3/1404* (2013.01); *B62B 3/1492* (2013.01); *B64D 11/0007* (2013.01); *G07F 7/0645* (2013.01)

(58) Field of Classification Search
CPC .... B64D 11/007; B62B 3/008; B62B 3/1404; B62B 3/1492; B62B 33/0068; B62B 33/00
See application file for complete search history.

(56) References Cited

U.S. PATENT DOCUMENTS

| | | | |
|---|---|---|---|
| 3,618,884 A * | 11/1971 | Wilson | B64D 11/04 248/501 |
| 5,960,615 A * | 10/1999 | Meetze | A01D 34/001 16/35 R |
| 2005/0133308 A1* | 6/2005 | Reysa | B64D 11/04 186/40 |
| 2015/0321761 A1* | 11/2015 | Young | B62B 3/008 280/47.34 |

FOREIGN PATENT DOCUMENTS

| | | |
|---|---|---|
| DE | 19900256 | 7/2000 |
| WO | WO 0001581 | 1/2000 |

OTHER PUBLICATIONS

Extended European Search Report for related foreign patent application EP 15 16 5173, European Patent Office, Sep. 28, 2015.
English machine-translation of abstract of WO 0001581, downloaded from Espacenet.com on Nov. 11, 2015.
English machine-translation of abstract of DE 19900256, downloaded from Espacenet.com on Nov. 11, 2015.
US 5,665,734, 8/1997, Dahl (withdrawn).

\* cited by examiner

*Primary Examiner* — John Walters
*Assistant Examiner* — James Triggs
(74) *Attorney, Agent, or Firm* — DASCENZO Intellectual Property Law, P.C.

(57) ABSTRACT

Cart control systems and methods of controlling cart caster direction allow for operation of carts near walls without caster jamming. Cart control systems comprise a cart with one or more swivel casters, a wall, and a guide surface proximate the wall that is configured to swivel outwardly at least one of the swivel casters to be directed toward the wall when the swivel caster traverses the guide surface in a direction substantially parallel to the wall. When the caster is directed toward the wall, the floor contact of the caster is further away from the wall than the swivel axis of the caster and generally under the cart. When reversing direction, the caster swivels outwardly, with the floor contact remaining further away from the wall and generally under the cart. Thus, the caster does not swivel into the wall and jam the cart.

20 Claims, 6 Drawing Sheets

CART CONTROL SYSTEMS AND METHODS FOR CONTROLLING CART CASTER DIRECTION

FIELD

The present disclosure relates to cart control systems and methods for controlling cart caster direction.

BACKGROUND

Carts with swivel casters (also called swivel castors) are maneuverable, but the casters may swivel unpredictably clockwise or counterclockwise when the direction of the cart is reversed. For use in confined areas, caster swivel may cause the cart to run into a wall or jam against a wall. For example, in aircraft galley areas, a common issue is the ability of a galley cart caster to swing outward into the galley cart compartment wall, which causes the wheels to jam and prevents the cart from being easily removed from the galley cart compartment.

Caster jamming typically becomes a problem when reversing the direction of a cart near a wall. One way to avoid caster jamming is to avoid placing a cart near a wall. For example, a cart may be stowed in a compartment that is wide enough to allow all casters to swivel freely through 360°. Though an effective solution, space is almost always at a premium, and operating sufficiently away from walls may not be an option.

Another way to avoid caster jamming is to employ the use of a side caster guide and/or a swivel stop. A side caster guide, a strip of material along a wall, may prevent casters from freely swiveling near the wall. By placing a strip of material along a wall, in close proximity to where a caster may protrude from under a cart, the swivel of the caster can be limited, preventing the casters from swinging into the wall and jamming. Due to wide variability in spacing and geometry of compartments, casters, carts, and associated components, caster guides typically must be custom tailored to each compartment, wall, cart, and caster combination. In addition, when fitting into a narrow space, the gap between a caster guide and a caster must be controlled precisely—too tight, and it will be difficult to roll the cart into the space, too loose, and the casters will jam. Further, carts may include a swivel stop that prevents the caster from swiveling to certain positions (such as protruding from under the cart). Swivel stops reduce the maneuverability of the cart generally and may cause some casters to drag rather than roll even when operated away from a wall.

Hence, a solution which can accommodate a wide variety of compartment, wall, cart, and caster combinations, without hindering use of the cart, would be beneficial.

SUMMARY

Cart control systems and methods of controlling cart caster direction allow for operation of carts near walls without caster jamming. Cart control systems comprise a cart with one or more swivel casters, a wall, and a guide surface proximate the wall that is configured to swivel at least one of the swivel casters to be directed toward the wall when the swivel caster traverses the guide surface in a direction substantially parallel to the wall. When the caster is swiveled toward the wall, the floor contact of the caster is further away from the wall than the swivel axis of the caster and, hence, generally under the cart. When reversing direction, the caster swivels outwardly such that the floor contact of the caster remains further away from the wall than the swivel axis of the caster. Thus, the caster does not swivel into the wall and jam the cart.

Methods for controlling the direction of a caster of a cart near a wall comprise moving the cart in a first direction along a length of the wall and swiveling the caster in a swivel direction (e.g., clockwise or counterclockwise) to be directed toward the wall by traversing a guide surface, followed by moving the cart in a second direction, opposite the first, along the length of the wall and swiveling the caster in the same swivel direction.

Cart control systems may comprise a floor with more than one guide surface, each proximate a wall, e.g., a left guide surface proximate a left wall and a right guide surface proximate a right wall. The guide surfaces each have a progressive direction, generally substantially parallel to each other. The guide surfaces are configured to swivel a caster outwardly, to be directed toward the proximate wall as the caster traverses the guide surface in the progressive direction. For example, in an outward swivel, a left caster swivels counterclockwise to be directed toward the proximate left wall and a right caster swivels clockwise to be directed toward the proximate right wall. When the cart direction is reversed, the same casters and guide surfaces are arranged and/or configured to swivel the casters outwardly, such that the following (trailing) portion of the caster generally remains under the cart. Thus, the casters do not swivel into the corresponding wall and jam the cart.

Methods for controlling the cart may comprise stowing the cart in a compartment by inserting the cart into the compartment while swiveling outwardly a left wheel to be directed left and a right wheel to be directed right and by removing the cart from the compartment while swiveling the left wheel and the right wheel outwardly.

DESCRIPTION

Figure 1:
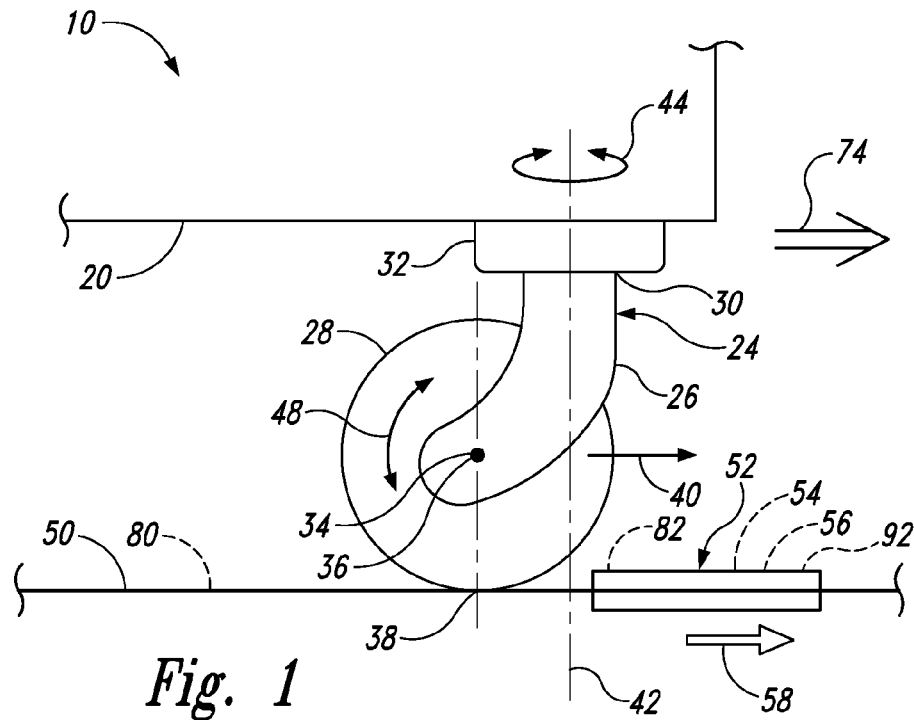
FIG. 1 is a schematic representation of cart control systems.

FIGS. 1-10 illustrate cart control systems and components thereof. Elements that serve a similar, or at least substantially similar, purpose are labeled with numbers consistent among the figures. Like numbers in each of FIGS. 1-10, and the corresponding elements, may not be discussed in detail herein with reference to each of FIGS. 1-10. Similarly, all elements may not be labeled in each of FIGS. 1-10, but reference numerals associated therewith may be used for consistency. Elements, components, and/or features that are discussed with reference to one or more of FIGS. 1-10 may be included in and/or used with any of FIGS. 1-10 without departing from the scope of the present disclosure. In general, elements that are likely to be included are illustrated in solid lines, while elements that may be optional or alternatives are illustrated in dashed lines and/or with dashed lead lines. However, elements that are shown in solid lines are not necessarily essential, and an element shown in solid lines may be omitted without departing from the scope of the present disclosure.

Figure 2:
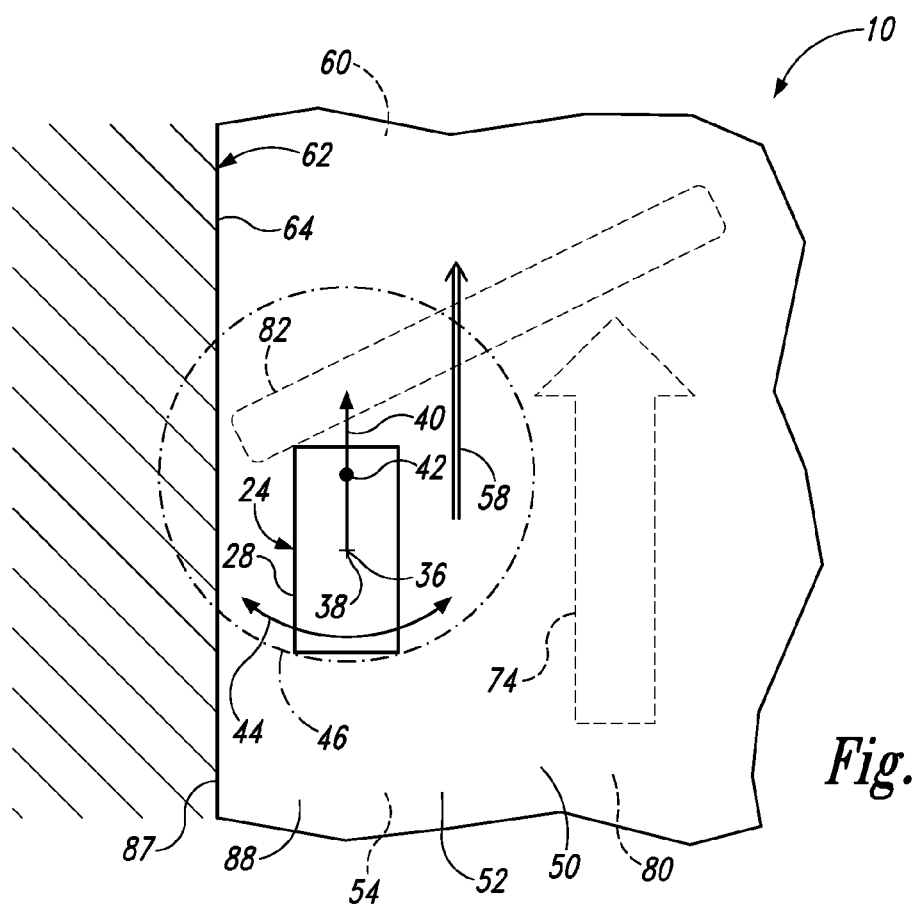
FIG. 2 is a schematic plan view of cart control systems.

FIGS. 1-2 illustrate cart control systems 10 that employ a guide surface 52 to avoid and/or to prevent caster jamming as the cart 20 is operated near a wall 62 (as shown in FIG. 2). Cart control systems 10 comprise a cart 20 with one or more swivel casters 24, a wall 62, a floor 50, and a guide surface 52 on the floor 50. The wall 62 is proximate the floor 50 and operatively coupled to the floor 50. The guide surface 52 is positioned proximate the wall 62 and configured to direct at least one of the casters 24 toward the wall 62 when the caster 24 is moved over the guide surface 52 in a defined direction (the progressive direction 58 of the guide surface 52) substantially parallel to the wall 62.

As used herein, directions, such as left, right, front, back, inward, outward, clockwise, and counterclockwise, are the directions from the perspective of a cart operator facing the cart 20 and standing behind the cart 20. Hence, forward is the direction in front of the operator; a left wall 64 is to the left of the operator and the cart 20. Inward and outward are respectively toward and away from the left-right midline of the system. Near a wall 62, inward refers to directions pointing away from the wall 62 and outward refers to directions pointing toward the wall 62. Thus, a direction from the left to the right is inward if the origin of the direction (the object associated with the direction) is on the left of the system and/or near the left wall 64. Similarly, a direction from the right to the left is inward if the origin of the direction is on the right of the system and/or near the right wall 66 (not shown in FIGS. 1-2).

Floor 50 generally is the supporting surface within a structure; however, the floor 50 may be an exterior surface such as the ground, a path, a road, a tarmac, etc. Floors 50 are configured to support cart 20. Also, floors 50 may be configured for wet environments such as in a galley, kitchen, bathroom, etc. Floors 50 may be configured to contain and/or divert liquid on the surface of the floor 50, and may be configured to avoid leakage of liquid through and/or around the floor 50 (thus controlling liquid and/or avoiding damage to structures beneath the floor 50).

At least one edge (e.g., left edge 87 shown in FIG. 2) and/or at least one end region (e.g., left end region 88 shown in FIG. 2) of the floor 50 is proximate the wall 62. Floors 50 may include a floor panel 80 that forms, is coupled to, is affixed to, and/or is supported by the floor 50. Where floor panels 80 are coupled, affixed, or otherwise secured to floors 50, the connection may be configured for a wet environment, for example, by sealing any penetrations through the floor panel 80 and/or the floor 50 for fasteners, and/or by using adhesives that require no penetrations through the floor panel 80 and/or the floor 50. Floors 50 may include more than one guide surface 52 and may be proximate more than one wall 62. The walls 62 and/or guide surfaces 52 may be at different edges and/or end regions of the floor 50, for example a front end region 84, a back end region 86, a left edge 87, a left end region 88, a right edge 89, and/or a right end region 90 as discussed further herein with respect to other figures and more specific embodiments. The progressive directions 58 of multiple guide surfaces 52 on the same floor 50 are generally aligned.

Casters 24 (also called castors) are wheel assemblies configured to be mounted to the bottom of an object, such as cart 20, to support the object and to allow the object to be moved. As used herein, cart 20 refers to any suitable object and is not limited only to objects configured, adapted, and/or designed to carry and/or transport other objects. Carts 20 may incorporate one or more casters 24 and typically have at least one caster 24 on opposite sides of the cart 20. For example, carts 20 may incorporate two front casters 24, e.g., one on the left and one on the right. As another example, carts 20 may incorporate four casters 24, e.g., one under each corner of a generally rectangular footprint cart.

Casters 24 include one or more wheels 28, a mounting mechanism 32 that couples the caster 24 to the rest of the cart 20, a swivel joint 30 coupled to the mounting mechanism 32, and a fork 26 coupled to the swivel joint 30 and rotationally coupled to the wheel(s) 28.

The wheel(s) 28 are configured to rotate about two, substantially orthogonal, axes: the rolling axis 34 and the swivel axis 42. The wheel 28 is configured to roll about the rolling axis 34 along the floor 50 (as represented by rolling motion 48 in FIG. 1). The contact between the floor 50 and the wheel 28 is the floor contact 38, which is generally vertically below the wheel center 36. The rolling axis 34 is generally horizontal, i.e., parallel to the floor 50. Casters 24 may include more than one wheel 28, with each wheel 28 configured to rotate about common axes. Hence, though the wheels 28 may roll independently, the motion of the wheels 28 may be considered together.

The wheel(s) 28 also are configured to swivel about the swivel axis 42 (as represented by swivel motion 44 in FIGS. 1-2). The swivel axis 42 is generally vertical, i.e., generally normal to the floor 50 and in the direction of gravity. When the wheel 28 swivels about the swivel axis 42, the orientation of the rolling axis 34 is changed and hence the rolling direction of the wheel 28 is changed. Generally, casters 24 are configured to allow the wheel 28 to swivel freely in any direction, at least one full swivel rotation.

The swivel axis 42 is offset from the wheel center 36 and the floor contact 38 of the wheel 28. Because of the offset of the swivel axis 42, casters 24 have a natural tendency to swivel such that the swivel axis 42 leads the wheel center 36 and the floor contact 38 when a cart 20 including the casters 24 is in motion. That is, given the opportunity for the wheel 28 to freely roll and to freely swivel, the wheel center 36 and the floor contact 38 follow, or trail, the swivel axis 42 along the direction of travel 74 of the cart 20. This natural, stable configuration of the caster 24 may be described as a wheel-following configuration or as a wheel-trailing configuration.

More generally, a wheel-following configuration, and a wheel-trailing configuration, exists any time the swivel axis 42 is farther forward along the direction of travel 74 of the cart 20 than the wheel center 36 and the floor contact 38. Hence, the caster 24 may be substantially misaligned with the direction of travel 74 and yet the caster 24 is in a wheel-following configuration. The opposite of a wheel-following configuration is a wheel-leading configuration. In a wheel-leading configuration, the wheel center 36 and the floor contact 38 are farther forward along the direction of travel 74 of the cart 20 than the swivel axis 42. A caster's configuration, whether wheel-following or wheel-leading or none at all, is dependent on the presence and direction of motion of the cart 20. A caster 24 in a wheel-following configuration at one moment may be described as in a wheel-leading configuration in the next moment if the direction of travel 74 of the cart 20 is suddenly reversed. If the cart 20 has no motion, the caster 24 is in neither a wheel-following configuration nor a wheel-leading configuration.

When the rolling direction of the wheel 28 is aligned with the direction of travel 74 of the cart 20, the caster 24 may be in a wheel-following configuration or a wheel-leading configuration. The aligned, wheel-following configuration (as generally shown in FIGS. 1-2) is the dynamic equilibrium of the cart-caster system. Hence, when the cart 20 is in motion, the caster 24 will swivel, if allowed and not already aligned, to the aligned, wheel-following configuration. The direction of the swivel, clockwise or counterclockwise (as seen from above the floor 50), is generally the direction with the smallest angular displacement that would result in the aligned, wheel-following configuration. If the caster 24 is in the aligned, wheel-leading configuration, the clockwise and counterclockwise directions are essentially equally probable and, thus, the swivel direction is essentially random and unpredictable.

The orientation 40 of a caster 24 is characterized by the direction of cart 20 motion that would result in an aligned, wheel-following configuration. This direction, and thus the caster orientation 40, is the direction from the wheel center 36 and floor contact 38 to the swivel axis 42 along a line perpendicular to the swivel axis 42. When a caster 24 is described as directed in a particular direction, the caster orientation 40 points in that direction. Similarly, when a caster 24 is described as directed toward an object, the caster orientation 40 points toward that object, in a direction that would lead the cart 20 toward the object if the direction of travel 74 of the cart 20 were the same as the caster orientation 40. For example, if the caster 24 is directed outward, the caster orientation 40 points toward the proximate wall 62. As another example, if the caster 24 is directed toward the proximate wall 62, the swivel axis 42 is nearer the wall 62 than the wheel center 36 and the floor contact 38.

Unlike the wheel-following configuration and the wheel-leading configuration, the caster orientation 40 does not rely on cart 20 motion and, hence, a caster 24 has a caster orientation 40 independent of the presence and direction of cart 20 motion. Though caster orientation 40 does not rely on cart 20 motion, cart 20 motion may cause the caster 24 to swivel and change the caster orientation 40 as the caster 24 seeks the aligned, wheel-following configuration.

As used herein, the swivel direction of a caster 24 is defined by the relative motion of the swivel axis 42 with respect to the wheel center 36 and the floor contact 38. As a caster 24 swivels in a direction, the swivel axis 42 moves in the direction relative to the wheel center 36 and floor contact 38. Swiveling outwardly means that the swivel axis 42 moves outward relative to the wheel center 36 and the floor contact 38. Swiveling left means that the swivel axis 42 moves left relative to the wheel center 36 and the floor contact 38. Swiveling counterclockwise means that the swivel axis 42 moves counterclockwise relative to the wheel center 36 and the floor contact 38. Though the directions clockwise and counterclockwise do not change names as a caster 24 swivels, whether a caster 24 is swiveling left or right, or, similarly, inwardly or outwardly, depends on the orientation 40 of the caster 24. A caster 24 that is directed forward swivels left if it swivels counterclockwise. A caster 24 that is directed backward swivels right if it swivels counterclockwise. Note also that the wheel center 36 and the floor contact 38 swivel in the opposite left-right and outward-inward sense as the caster 24, but swivel in the same clockwise-counterclockwise sense.

Hence, as a caster 24 swivels outwardly, the wheel center 36 and the floor contact 38 swivel inwardly, i.e., as the swivel axis 42 moves outward relative to the wheel center 36 and the floor contact 38, the wheel center 36 and the floor contact 38 move inward relative to the swivel axis 42.

As a caster 24 swivels about its swivel axis 42, the widest extent of the caster 24, typically the wheel 28, sweeps an arc around the swivel axis 42. The locus 46 of all possible caster 24 positions is illustrated as a broken circle in FIG. 2. However, locus 46 may not always be a true circle, for example, if the swivel of the caster 24 is angularly limited to less than 360°, or the swivel axis 42 is not vertical.

Cart jamming is a concern when the locus 46 of possible positions of one or more casters 24 intersects a wall 62, as illustrated in FIG. 2. Generally, walls 62 are substantially vertical and, hence, casters 24 that may present a jamming risk are located generally near the edge of the cart 20 such that the locus 46 of the caster 24 extends beyond the footprint 22 of the cart 20. The footprint 22 of the cart 20 is the vertical projection of the cart 20 onto the floor 50, ignoring the casters 24.

To avoid and/or to prevent casters 24 from swiveling into a wall 62 and jamming, cart control systems 10 comprise at least one guide surface 52 on the floor 50. The guide surface 52 is configured to guide casters 24 such that a reversal in the cart 20 direction does not lead to the caster 24, while in a wheel-leading configuration, extending substantially beyond the width, transverse to the direction of travel 74, of the footprint 22 of the cart 20. Cart control systems 10, guide surfaces 52, floors 50, and/or floor panels 80 may be further configured to be lightweight, for example, incorporating lightweight materials and/or lightweight connector mechanisms (e.g., using adhesives rather than fasteners).

Guide surfaces 52 generally redirect the caster 24 as it travels in the progressive direction 58 across the guide surface 52. The progressive direction 58 of the guide surface 52 is substantially parallel to the proximate wall 62 and is broadly described as forward. Thus, when the direction of travel 74 of the cart 20 is substantially in the progressive direction 58 of the guide surface 52 (i.e., forward), the caster(s) 24 that move over the guide surface 52 (e.g., a left guide surface 54) swivel such that the caster orientation 40 points toward the proximate wall 62 (e.g., the left wall 64). For example, in FIG. 2, if the caster 24 were to move forward (up in the figure), the caster 24 would swivel about the swivel axis 42 counterclockwise so that the caster orientation 40 would point to the left wall 64. Though not illustrated in FIG. 2, the same effect happens near a right wall 66. That is, a caster 24 moving across a right guide surface 56 substantially in the progressive direction 58 (i.e., forward) would swivel about the swivel axis 42 clockwise so that the caster orientation 40 would point to the right wall 64. This clockwise swivel (for right guide surfaces 56) and counterclockwise swivel (for left guide surfaces 54) may also be described as swiveling outwardly (i.e., respectively toward the right wall 66 and the left wall 64). When casters 24 swivel outwardly to become directed outward, the swivel axis 42 is nearer the proximate wall 62 than the wheel center 36 and the floor contact 38. Hence, the wheel center 36 and the floor contact 38 are generally within the footprint 22 of the cart 20.

Once in this arrangement with the casters 24 directed outward, if the direction of travel 74 of the cart 20 is substantially reversed (to travel backward and substantially opposite the progressive direction 58 of the guide surface 52), the natural swivel of the casters 24 to the aligned, wheel-following configuration will swivel the casters 24 outwardly, i.e., casters 24 on a left guide surface 54 will swivel counterclockwise and casters 24 on a right guide surface 56 will swivel clockwise. In addition to the natural swivel of the casters 24, the guide surface 52 may be configured to cause the casters 24 to swivel outwardly when the caster 24 in a wheel-leading configuration moves over the guide surface substantially opposite the progressive direction 58 (the direction opposite the progressive direction 58 may also be referred to as the regressive direction). Specifically, after the cart 20 motion substantially in the progressive direction 58 leaves the casters 24 directed outward, a reversal in direction will, at least initially, put the casters in a wheel-leading configuration. The guide surfaces 52 may be configured to swivel outwardly the casters 24 now in the wheel-leading configuration as those casters 24 move over the guide surface 52 substantially opposite the progressive direction 58. Note that the guide surfaces 52 generally are configured to cause the casters 24 to swivel in the same clockwise or counterclockwise direction as the caster 24 travels across the guide surface 52 in the progressive direction 58 and in the regressive direction.

Guide surfaces 52 operate by establishing a force imbalance between different sides of the wheel(s) 28 of a caster 24. Stated differently, guide surfaces 52 operate by establishing a torque about the swivel axis 42 of the caster 24. Guide surfaces 52 may be configured to encourage caster 24 swiveling in the desired direction by impeding and/or facilitating rolling of one side of the wheel(s) 28. For example, if a caster 24 includes two wheels 28, a left wheel (that is on the left side of the caster 24 when the caster 24 is directed forward) and a right wheel (that is on the right side of the caster 24 when the caster 24 is directed forward), the guide surface 52 may be configured to impede and/or facilitate the rolling of just one of the wheels, causing the caster 24 to swivel clockwise or counterclockwise. In FIG. 2, the wheel 28 of the caster 24 is encountering a caster deflector 82 (as described further herein) at an angle such that the left side of the wheel 28 encounters the caster deflector 82 before the right side of the wheel 28 when the wheel 28 is moving forward in the progressive direction 58.

Guide surfaces 52 may include one or more caster deflectors 82 configured to encourage the caster 24 to swivel in the desired direction (e.g., clockwise or counterclockwise). Guide surfaces 52 and/or caster deflectors 82 may be arranged to encounter a variety of caster shapes, sizes, and/or positions. For example, the floor 50 may be configured to redirect casters 24 on carts 20 with different spacings between casters 24 and/or different relative positions of the casters 24 (relative to the cart footprint 22). Hence, a single floor 50 and/or floor panel 80 may have one arrangement of guide surface(s) 52 and/or caster deflectors 82 that is configured to guide the casters 24 of many different types, sizes, and/or configurations of carts 20. Thus, the floor 50 and/or the floor panel 80 does not need to be reconfigured to accommodate a range of carts 20. One example arrangement includes a guide surface 52 and/or a caster deflector 82 that is wider, in the direction transverse to the progressive direction 58, than the wheel(s) 28 of a caster 24. For example, the guide surface 52 and/or the caster deflector 82 may be wider than 10 mm, 20 mm, 30 mm, 40 mm, 50 mm, 60 mm, 80 mm, 100 mm, 150 mm, 200 mm, or 500 mm.

Guide surfaces 52 and/or caster deflectors 82 may include changes in elevation. For example, caster deflectors 82 may include changes in elevation along the progressive direction 58 (and therefore along the direction of travel 74 of the cart 20 when the cart 20 is moving forward or backward). Illustrative, non-exclusive examples of caster deflectors 82 include a ridge, a crest, a strip, a ramp, a bump, a bar, an elongated convexity, a valley, a channel, a groove, a depression, a gap, and an elongated concavity. Where caster deflectors include changes in elevation, the guide surface 52 and/or the floor 50 may be hollow (and/or may include voids and/or hollow spaces) under the protrusions from the minimum elevation. Being hollow and/or including voids and/or hollow spaces may allow for production of lightweight cart control systems 10, floors 50, guide surfaces 52, and/or caster deflectors 82. In addition or in alternate to changes in elevation, guide surfaces 52 and/or caster deflectors 82 may include changes in surface properties such as texture, coefficient of friction, adhesion, hardness, compliance, etc. Where present, the changes in elevation and other surface properties (e.g., changes along the progressive direction 58 of the guide surface 52 and/or changes between a caster deflector 82 and the guide surface 52 and/or another caster deflector 82) may be configured to encourage caster 24 swiveling. Where present, changes in elevation along the progressive direction 58 are generally smaller than the radius of a wheel 28 and generally larger than about 1% of the radius, e.g., at least 0.5%, 1%, 2%, 3%, 4%, 5%, 6%, 8%, 10%, or 20% and/or less than 100%, 50%, 20%, or 10% of the radius. Typical wheels 28 have a radius of about 10 mm, 20 mm, 30 mm, 40 mm, 50 mm, 60 mm, 80 mm, 100 mm, or 150 mm. Hence, elevation changes may be at least 0.5 mm, 1 mm, 2 mm, 3 mm, 4 mm, 5 mm, 6 mm, 8 mm, 10 mm, 15 mm, 20 mm, or 30 mm, and/or less than 150 mm, 100 mm, 50 mm, 40 mm, 30 mm, 20 mm, 10 mm, or 5 mm.

Guide surfaces 52 may include a plurality of caster deflectors 82 such as a series and/or an array of caster deflectors 82. The plurality of caster deflectors 82 may be periodically arranged, with one or more spacing periods. Where two or more caster deflectors 82 are included, the spacing between caster deflectors 82 is configured such that a wheel 28 would interact with one caster deflector 82 at a time. Hence, the spacing between caster deflectors 82 may be similar to the radius of a wheel 28. For example, the spacing between two caster deflectors 82, and/or the spacing period between a periodic series of caster deflectors 82, may be at least 5 mm, 10 mm, 20 mm, or 40 mm; less than 150 mm, 100 mm, 80 mm, 60 mm, 40 mm, 20 mm, or 10 mm; and/or about 10 mm, 20 mm, 30 mm, 40 mm, 50 mm, 60 mm, 70 mm, or 80 mm.

Caster deflectors 82 may be integral to the guide surface 52, the floor 50, and/or the floor panel 80. Additionally or alternatively, one or more caster deflectors 82 may be coupled to, affixed to, and/or supported by the guide surface 52, the floor 50, and/or the floor panel 80. Where caster deflectors 82 are coupled, affixed, or otherwise secured to the guide surface 52, the floor 50, and/or the floor panel 80, the caster deflectors 82 may be coupled, affixed, or otherwise secured with adhesives and/or fasteners. Generally, reliance on adhesives and/or reduced reliance on fasteners may yield a weight savings in the structure incorporating the caster deflector 82 and/or may yield a cost savings due to the resulting reduction in assembly time. Existing floors and/or floor panels may be modified to include a guide surface 52 (and thus become a floor 50 and/or floor panel 80) by coupling, affixing, and/or supporting suitable floor panels 80 and/or caster deflectors 82. Modification of existing floors and/or floor panels may include arranging one or more caster deflectors 82 to swivel casters 24 outwardly, toward the proximate wall 62, when a caster 24 traverses the caster deflector(s) 82 in the progressive direction 58.

Caster deflectors 82 may be elongated and generally oriented with the elongate direction generally transverse, but not necessarily perpendicular, to the progressive direction 58 of the guide surface 52. In this arrangement, caster deflectors 82 are typically configured to redirect casters 24 that encounter the caster deflector 82 at a range of positions along the elongate direction. Hence, precise alignment of the caster 24 and the caster deflector 82 is not required to redirect the caster 24.

Caster deflectors 82 may be arranged at an angle to the progressive direction 58 so that a wheel 28 travelling in the progressive direction 58 will encounter the caster deflector 82 with one side of the wheel 28 before the other side of the wheel 28. For example, for caster deflectors 82 that impede travel, the caster deflector 82 may be oriented such that the outward side of the wheel 28 would encounter the caster deflector 82 before the inward side of the wheel 28, causing the inward side of the wheel 28 to roll faster and/or more freely, and, thus, the wheel 28 would swivel outwardly. For caster deflectors 82 that facilitate travel, the caster deflector 82 may be oriented such that the inward side of the wheel 28 would encounter the caster deflector 82 before the outward side of the wheel 28, causing the inward side of the wheel 28 to roll faster and/or more freely, and, thus, the wheel 28 would swivel outwardly. An elongated caster deflector 82 may have its elongate direction oriented about 50°, 60°, 65°, 70°, 75°, 80°, 85°, or 90° from the progressive direction 58. The acute angle between the elongate direction and the progressive direction 58 may be 45°-90°, 50°-90°, 50°-85°, 60°-80°, and/or 60°-75°

Caster deflectors 82 may be essentially symmetric or asymmetric along the progressive direction 58 (and/or, if elongated, perpendicular to the elongate direction of the caster deflector 82). For example, a caster deflector 82 that includes an elevation change may present a uniform hump. As another example, a caster deflector 82 that includes an elevation change may present a ramp, e.g., a smooth ramp, in the progressive direction 58 that is different than a ramp, e.g., an abrupt ramp, in the regressive (opposite) direction. Hence, an asymmetric caster deflector 82 may present different forces and/or torques when a caster 24 encounters the caster deflector 82 while travelling in the progressive direction 58 or opposite the progressive direction 58.

Caster deflectors 82 and/or guide surfaces 52 may further be configured as a caster lock and/or a cart lock. That is, caster deflectors 82 and/or guide surfaces 52 may be configured to impede rolling of the cart 20 and/or one or more casters 24. When a cart 20 travels in the progressive direction 58 over the guide surface 52, the caster(s) 24 that encounter the guide surface 52 swivel outwardly to be directed outward, toward the wall 62. A floor 50 may be configured to direct at least two casters 24 of a cart 20 contrary to one another (e.g., a left caster 24 directed left and a right caster 24 directed right). Hence, the contrary oriented casters 24 would resist rolling together and the cart 20 would resist rolling, at least until the casters 24 swivel to substantially align. Though such a crossed-caster configuration may stabilize and secure the cart 20 from forces too small to drag the cart 20, other locking mechanisms may be used in addition to, or in place of, the locking configuration of caster deflectors 82 and/or guide surfaces 52. Other locking mechanisms may include caster locks and cart restraints.

As casters 24 travel across guide surfaces 52, the interaction of the caster 24 and the guide surface 52 may tend to cause noise and/or vibrations that rattle the cart 20 and/or items supported by the cart 20. This noise and/or vibration can be suppressed and/or eliminated by incorporating sound dampening material 92 into the cart control system 10. For example, caster deflectors 82, guide surfaces 52, floors 50, and/or floor panels 80 may include, may be formed of, and/or may be covered by, sound dampening material 92. In addition to abating noise and/or vibrations, sound dampening material 92 may at least temporarily support the cart 20. Hence, sound dampening material 92 also may be adapted to support the weight of the cart 20 and/or may be tough and/or resilient enough to withstand the wear of use. Sound dampening material 92 may be pliable, non-rigid, soft, elastic, viscoelastic, and/or spongy. For example, sound dampening material 92 may include plastic, rubber, foam, and/or a lower durometer material (e.g., less than 90 on the Shore-A hardness scale).

Figures 3, 4:
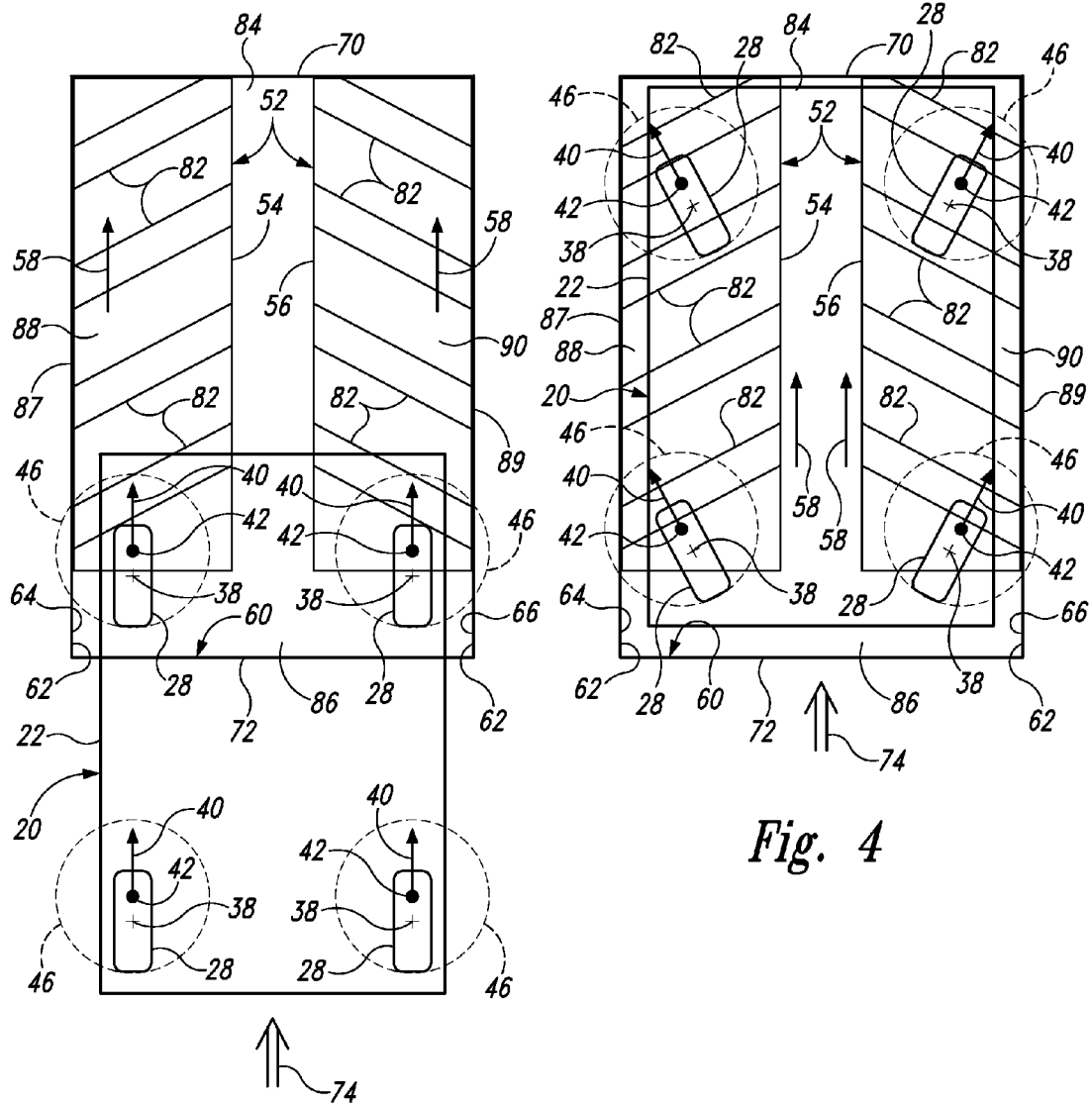
FIG. 3 is a schematic plan view of cart control systems at the beginning of cart insertion into a compartment.
FIG. 4 is a schematic plan view of cart control systems at the end of cart insertion into a compartment.

Cart control systems 10 may include a compartment 60 as indicated in FIG. 2 and as shown in the illustrative, non-exclusive example of FIG. 3. Compartments 60 include at least two walls 62, a left wall 64 and a right wall 66, coupled to a floor 50. The compartment 60 may be configured to stow the cart 20 and, hence, cart control systems 10 including a compartment 60 for stowage may be called cart stowage systems. Such cart control systems 10 are configured to avoid and/or to prevent caster jamming as the cart 20 is inserted into and removed from the compartment 60. Compartment 60 also includes a threshold 72, an entrance and exit for carts 20, and a terminus 70, the end of the compartment 60. The compartment 60 may be configured to substantially enclose the cart 20 when the cart 20 is inserted into the compartment 60.

The floor 50 in the compartment 60 includes at least two guide surfaces 52: a left guide surface 54 associated with the left wall 64, and a right guide surface 56 associated with the right wall 66. The left guide surface 54 is proximate the left wall 64 and is configured to redirect a caster 24 travelling in the progressive direction 58 toward the left wall 64. The right guide surface 56 is proximate the right wall 66 and is configured to redirect a caster 24 travelling in the progressive direction 58 toward the right wall 66. The left guide surface 54 and the right guide surface 56 may be spaced apart, abutting, adjoining, and/or interleaved with each other and/or other guide surfaces 52. The progressive directions 58 of the left guide surface 54 and the right guide surface 56 are generally pointing from the threshold 72 to the terminus 70. Hence, the forward direction with respect to the compartment 60 is the direction from the threshold 72 to the terminus 70 and is the direction of insertion of the cart 20 into the compartment 60. Likewise, the backward direction with respect to the compartment 60 is the direction from the terminus 70 to the threshold 72 and is the direction of removal of the cart from the compartment 60. The corresponding end regions of the floor 50 are the front end region 84 proximate the terminus 70 and the back end region 86 proximate the threshold 72.

The compartment 60 is wider than the footprint 22 of the cart 20 but is generally wider by a small amount to conserve floor space for other use. The width of the compartment 60 is generally less than the corresponding width of the cart 20 with the caster(s) 24 extended the maximum extent possible (generally perpendicular to the width) outside of the footprint 22 of the cart 20. With such a narrow compartment 60, a conventional system, without any guide surface 52, may allow for insertion of a cart without significant difficulty but removal of the cart may result in caster jamming. In a conventional system, the casters of the cart would be in a stable wheel-following configuration as the cart was inserted. However, upon attempt to remove the cart, the reversed direction results in an unstable wheel-leading configuration. The unstable wheel-leading casters would swivel in random directions (clockwise or counterclockwise) with a high likelihood that at least one would swivel inwardly, directing the following (trailing) portion of the caster into one of the compartment walls and jam the cart from further removal. The guide surface(s) 52 of the cart control system 10 avoids cart jamming by directing the casters 24 to swivel outwardly when the cart 20 is removed form compartment 60.

FIGS. 3-6 show an illustrative, non-exclusive example of a cart control system 10 as a cart 20 is inserted into and removed from a compartment 60. In this example, the cart 20 includes four casters 24, one near each corner of the cart 20. At the beginning of cart insertion shown in FIG. 3, the cart 20 is maneuvered to cross the threshold 72 of the compartment 60. When the cart 20 is travelling straight and forward, with the direction of travel 74 towards the terminus 70 of the compartment 60, and prior to interaction with the guide surfaces 52, the casters 24 swivel to the aligned, wheel-following configuration (with the caster orientation 40 pointing in the direction of travel 74, i.e., forward). As the casters 24 encounter the guide surfaces 52 traveling substantially along the progressive direction 58, the corresponding guide surface 52 swivels each caster 24 outwardly to direct each caster 24 outward, toward the proximate wall 62, as seen in FIG. 4. That is, the casters 24 on the left side of the cart 20 swivel counterclockwise to be directed toward the left wall 64 and the casters 24 on the right side of the cart 20 swivel clockwise to be directed toward the right wall 66.

As the cart 20 travels forward into the compartment 60, guide surfaces 52 generally keep the casters 24 generally directed outward. Once two casters 24 are directed contrary to each other, the motion of the cart 20 forward into the compartment 60 is a combination of caster 24 dragging and rolling. When the cart 20 is fully inserted into the compartment 60, as seen in FIG. 4, the cart 20 may be enclosed by the compartment 60 with the casters 24 directed towards the respective proximate wall 64 (e.g., the left wall 64 or the right wall 66).

Figures 5, 6:
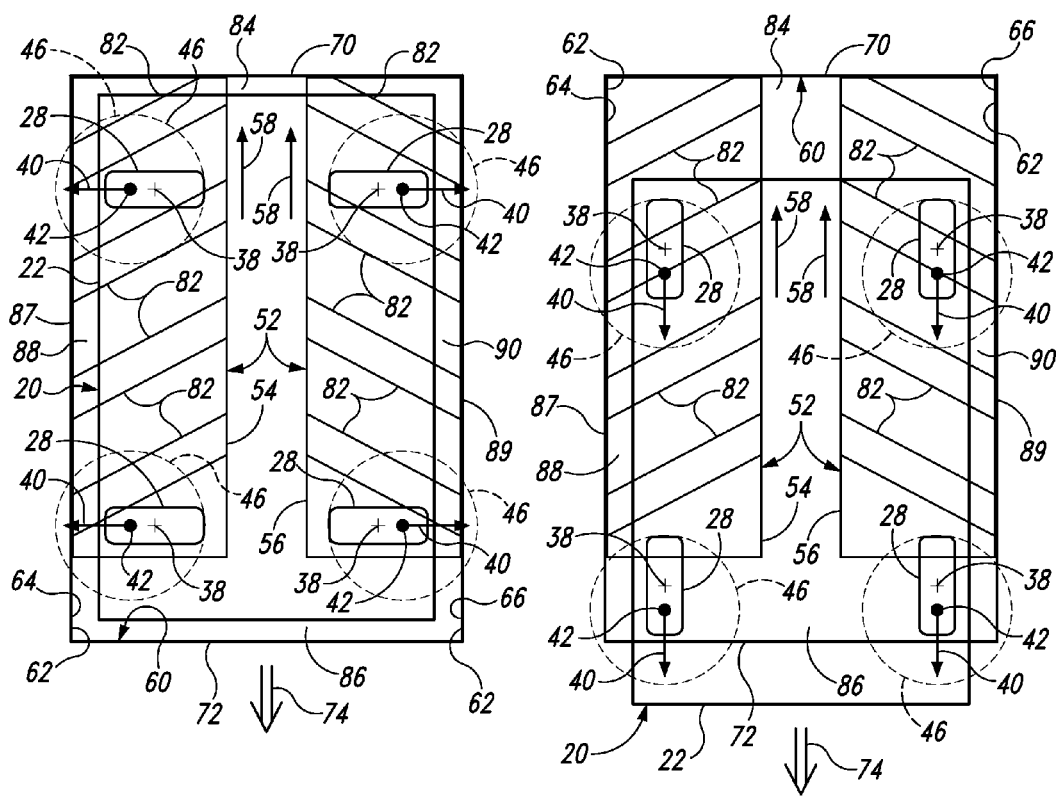
FIG. 5 is a schematic plan view of cart control systems at the beginning of cart removal from a compartment.
FIG. 6 is a schematic plan view of cart control systems at the end of cart removal from a compartment.

To remove the cart 20 from the compartment 60, the direction of travel 74 is backward (i.e., from the terminus 70 to the threshold 72), and, hence, opposite the progressive directions 58 of the guide surfaces 52. At the beginning of cart removal, the casters 24 being initially aligned as shown in FIG. 4, the casters 24 are in a wheel-leading configuration (with the caster orientations 40 pointing generally opposite the direction of travel 74, i.e., pointing generally forward). As the cart 20 is moved out of the compartment 60, the casters 24 swivel outwardly (as shown in FIG. 5) due to the initial outward caster orientation 40 and/or the action of the casters 24 as they move over the guide surfaces 52 opposite the progressive direction 58. When one or more casters 24 are free of the corresponding guide surface 52, the caster 24 returns to the directionally stable wheel-following configuration shown in FIG. 6.

The caster deflectors 82 in the examples of FIGS. 3-6 are elongated and may accept a variety of carts 20 and a variety of cart insertion conditions. For example, a cart 20 with a narrower or wider spacing between casters 24 would still be affected by the guide surfaces 52 and the caster deflectors 82 and hence the cart control system 10 would remain operational. As another example, the guide surfaces 52 and the caster deflectors 82 would still affect the direction of the casters 24 if the cart 20 is inserted nearer to, or farther from, the left wall 64.

Figure 7:
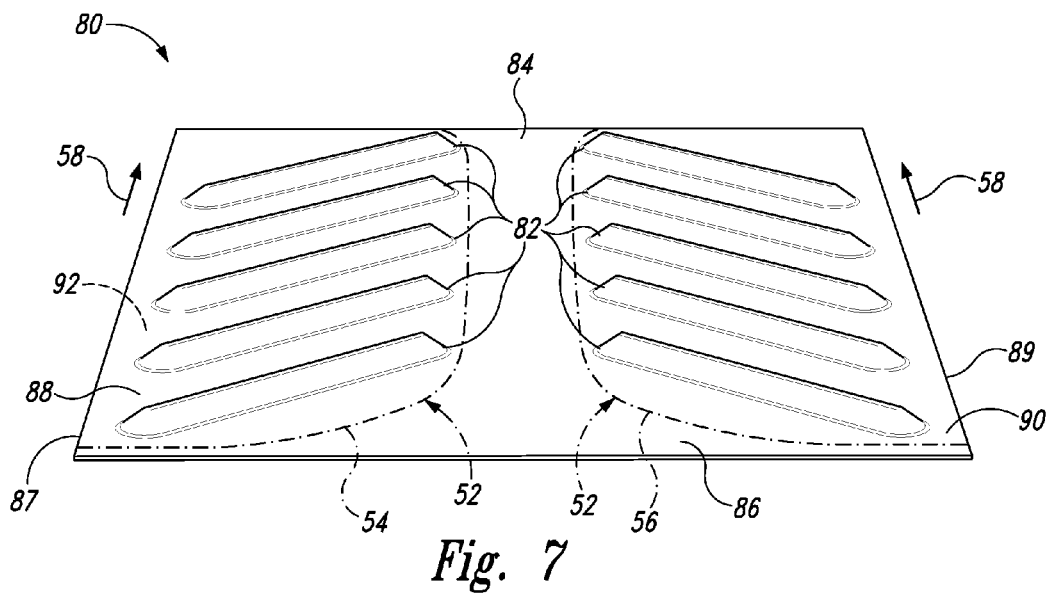
FIG. 7 is a perspective view of an illustrative, non-exclusive example of a floor panel with caster deflectors.

FIG. 7 shows an illustrative, non-exclusive example of a floor panel 80 with two guide surfaces 52 (a left guide surface 54 and a right guide surface 56) configured to redirect casters 24 (not shown) travelling substantially in the progressive direction 58 of each guide surface 52. The left guide surface 54 is at least partially within the left end region 88 of the floor panel 80 and the right guide surface 56 is at least partially within the right end region 90 of the floor panel 80. The progressive directions 58 of the guide surfaces 52 are generally aligned with each other and point forward, toward the front end region 84 of the floor panel 80.

The guide surfaces 52 include an approximately periodic series of caster deflectors 82. Each caster deflector is an elongated rounded bump. Each caster deflector 82 is arranged at an angle to the respective progressive direction 58 (at an acute angle of approximately 60°-80°). The caster deflectors 82 of the left guide surface 54 and the right guide surface 56 are angled such that the central portion (nearest the midline of the floor panel 80 between the left edge 87 and the right edge 89) of each caster deflector 82 is closer to the front end region 84 of the floor panel 80 than the outer portion (nearest the left edge 87 or the right edge 89) of the caster deflector 82. The left guide surface 54 and the right guide surface 56 are approximate mirror images of each other.

In this example, the floor panel 80 is a single monolithic part, configured to fit within a compartment 60, to serve as the floor 50 of a compartment 60, and/or to serve as a floor 50 proximate a left wall 64 and a right wall 66. The left edge 87, the left end region 88, the right edge 80, and/or the right end region 90 of the floor panel 80 are configured to align with the corresponding left wall 64 or right wall 66. The front end region 84 and the back end region 86 of the floor panel 80 may be configured to align with the terminus 70 and the threshold 72, respectively, of the compartment 60.

Figure 8:
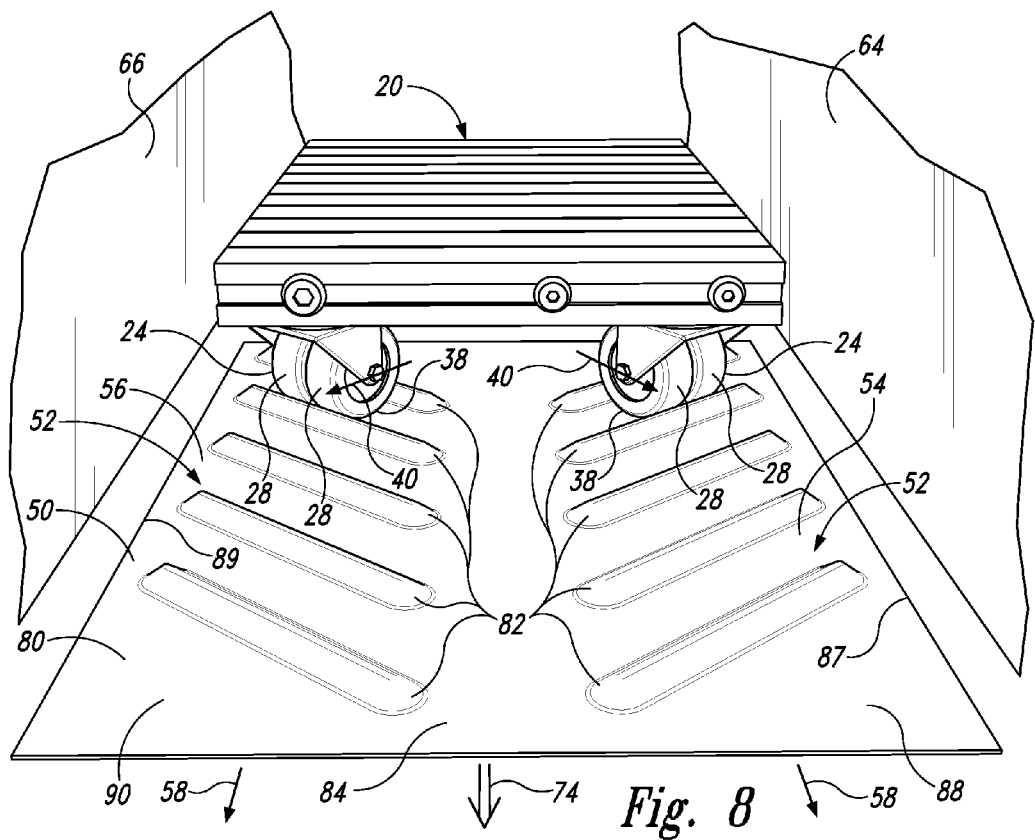
FIG. 8 is a perspective view of an illustrative, non-exclusive example of a cart control system at the beginning of cart insertion into a compartment, as viewed from the terminus of the compartment.
Figure 9:
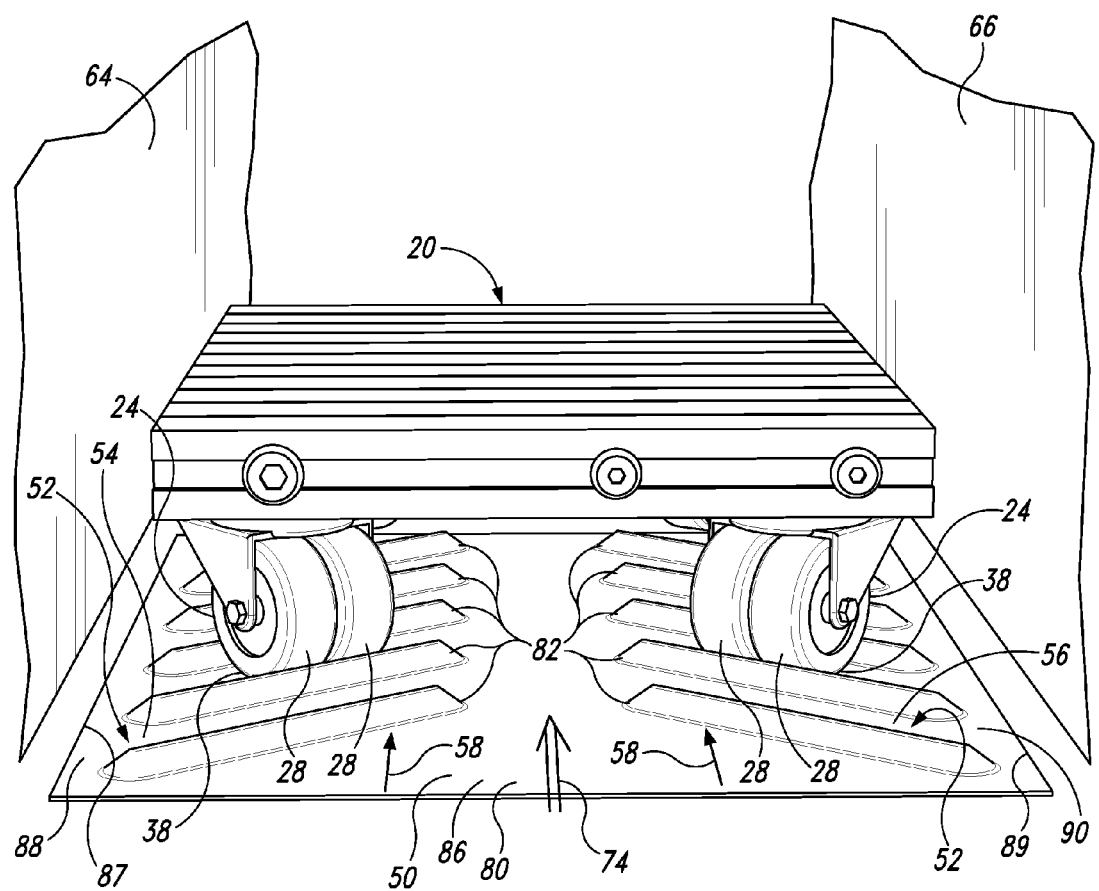
FIG. 9 is a perspective schematic of an illustrative, non-exclusive example of a cart control system at the beginning of cart insertion into a compartment, as viewed from the threshold of the compartment.

FIGS. 8-9 illustrate a compartment 60 as a cart is inserted, as viewed from the terminus 70 of the compartment 60 (FIG. 8) and from the threshold 72 of the compartment (FIG. 9). The compartment 60 includes a floor 50 with two guide surfaces 52, a left guide surface 54 and a right guide surface 56. The floor 50 may be, or may include, a floor panel 80 such as the illustrative, non-exclusive example of FIG. 7. As seen in FIG. 8, the casters 24 are directed outward, toward the nearest wall 62 (the left wall 64 or the right wall 66). As the casters 24 encounter the caster deflectors 82, illustrated as elongated bumps, the casters 24 swivel to align the caster orientation 40 perpendicular to the elongated direction of the caster deflectors 82. As seen in FIG. 9, this alignment causes the following (trailing) portion of the caster 24, including the floor contact 38, to remain within the footprint 22 of the cart 20.

Figure 10:
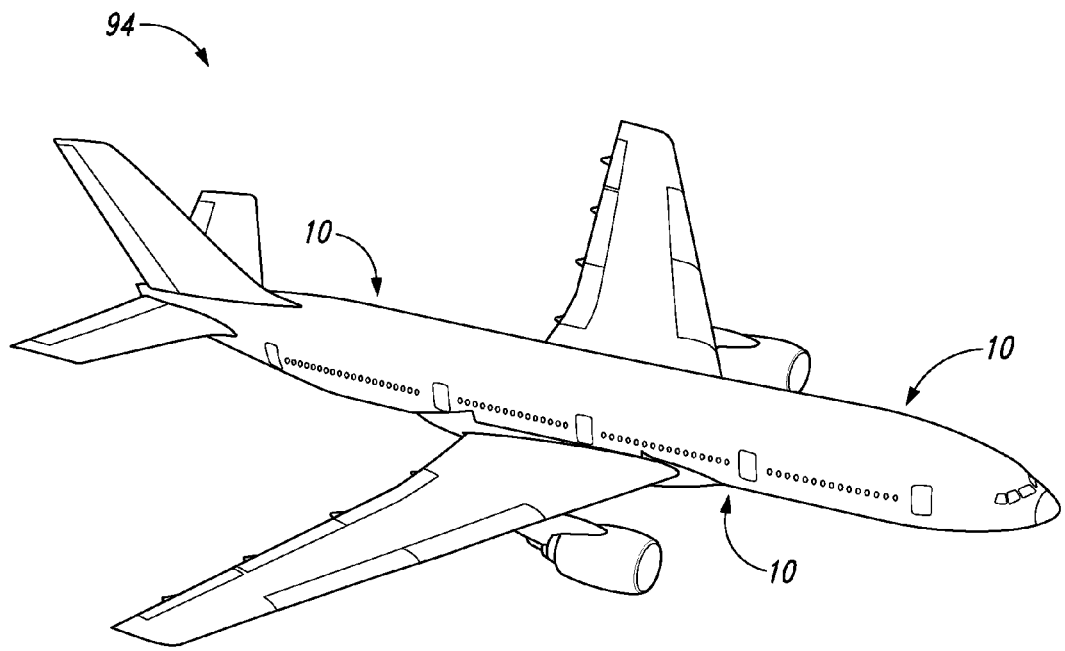
FIG. 10 is an illustration of an aircraft that includes one or more cart control systems.

Cart control systems 10 of the present disclosure may be used in a variety of locations and situations. For example, aircraft 94 (as seen in FIG. 10) have weight and space constraints that may favor inclusion of one or more cart control systems 10. In aircraft 94, carts 20 for food service (called galley carts and/or food service carts) are stowed in compartments 60 in the galley area of the aircraft 94. As described herein, the compartments 60 include guide surfaces 52 to prevent caster jamming of the galley carts as the carts are inserted and removed from the compartments 60. Compartments 60 can accommodate galley carts of a variety of footprints 22, caster types, and caster spacings, facilitating exchange and/or replacement of galley carts within the aircraft 94.

Figure 11:
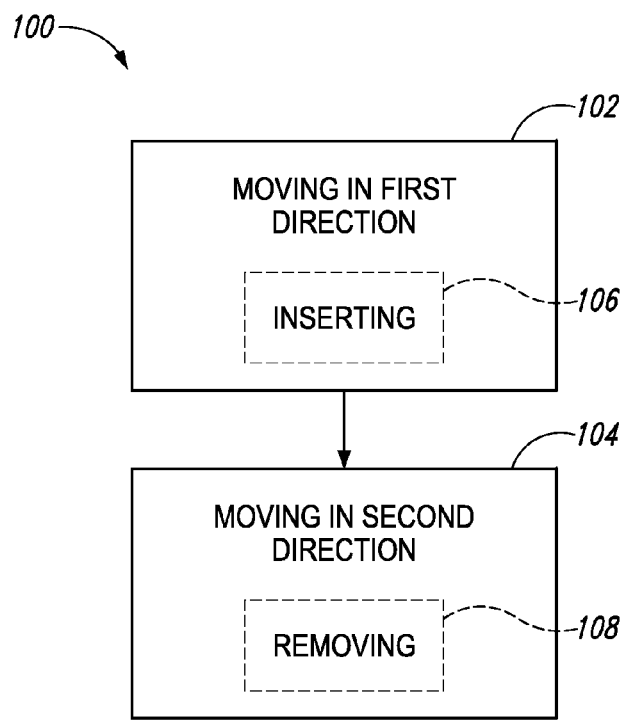
FIG. 11 is a schematic representation of methods of cart control according to the present disclosure.

FIG. 11 schematically represents methods 100 of controlling a direction of a caster near a wall. Generally, methods 100 may comprise controlling the direction of at least one caster near a wall and/or may comprise the coordinated control of the direction of several casters on a single cart, for example during cart stowage. Methods 100 may be used with cart control systems 10 and components thereof.

Methods 100 of controlling the direction of a caster may comprise moving 102 a cart with a caster in a first direction along the length of a wall (i.e., in the direction of the length of the wall), followed by moving 104 the cart in a second direction, substantially opposite the first direction. To avoid jamming the caster against the wall upon direction reversal, moving 102 in the first direction includes swiveling the caster outwardly, to be directed toward the wall by traversing a guide surface, such as guide surface 52. The first direction may be the progressive direction of the guide surface. The outward swivel of moving 102 swivels the caster such that the following (trailing) portion of the caster generally is within the footprint of the cart. Moving 104 in the second direction includes swiveling the caster outwardly, such that the following (trailing) portion of the caster remains generally within the footprint of the cart, thus avoiding jamming the caster against the wall. Generally, moving 104 includes swiveling the caster to the stable wheel-following configuration. Moving 104 in the second direction may include moving the caster over the guide surface in the second direction. In which case, the traversal of the guide surface in the second direction by moving 104 in the second direction may preferentially swivel the caster outwardly.

Methods 100 may comprise coordinated control of several casters on a cart. For example, moving 102 in the first direction may include swiveling two casters on opposites sides of the cart in opposite directions (one clockwise and one counterclockwise) such that each caster is directed toward a different, proximate wall, e.g., a left caster directed toward a left wall and a right caster directed toward a right wall. As another example, moving 102 in the first direction may include swiveling two casters on the same side of a cart in the same direction (clockwise or counterclockwise) such that both casters are directed toward a wall proximate the side of the cart and the casters. The swiveling may include traversing a guide surface with each caster and/or may include traversing different guide surfaces with different casters. Further, moving 104 in the second direction, e.g., reversing the cart, may include swiveling the two casters on opposite sides of the cart and/or may include swiveling the two casters on the same side of the cart.

Methods 100 may comprise stowing a cart in a compartment. In this case, moving 102 in a first direction comprises inserting 106 a cart into the compartment and moving 104 in a second direction comprises removing 108 the cart from the compartment. The cart includes at least a left caster and a right caster. The compartment includes a left wall and a right wall. The compartment between the left wall and right wall is wider than the cart footprint and narrower than the cart with the casters fully extended (e.g., the left caster swiveled such that the following (trailing) portion of the caster extends left and the right caster swiveled such that the following (trailing) portion of the caster extends right). Inserting 106 includes swiveling the left caster to be directed left near the left wall and swiveling the right caster to be directed right near the right wall. Inserting 106 may include traversing a left guide surface with the left caster and a right guide surface with the right caster. Removing 108 includes reversing the direction of the cart and swiveling the left caster and the right caster outwardly, optionally to reach a stable wheel-following configuration. Further, inserting 106 may include securing the cart in the compartment and removing 108 may include releasing the cart from the compartment.

Illustrative, non-exclusive examples of inventive subject matter according to the present disclosure are described in the following enumerated paragraphs.

A1. A floor comprising:
    a left end region including a left guide surface, a right end region including a right guide surface, a back end region, and a front end region;
    a left edge proximate the left end region and a right edge proximate the right end region;
    wherein the left guide surface includes a caster deflector configured to deflect a left swivel caster such that the left swivel caster is directed toward the left edge; and
    wherein the right guide surface includes a caster deflector configured to deflect a right swivel caster such that the right swivel caster is directed toward the right edge.

A2. The floor of paragraph A1, wherein the floor includes, and optionally is, a floor panel, and optionally wherein the floor includes a floor panel affixed to the floor, optionally with adhesive and/or optionally without fasteners penetrating the floor.

A3. The floor of any of paragraphs A1-A2, wherein the floor is configured to support a cart with swivel casters.

A4. The floor of any of paragraphs A1-A3, wherein the left guide surface and/or the right guide surface has a progressive direction pointing from the back end region to the front end region.

A4.1. The floor of paragraph A4, wherein the left guide surface is configured to direct a caster toward the left edge when the caster traverses the left guide surface in the progressive direction.

A4.2. The floor of any of paragraphs A4-A4.1, wherein the left guide surface is configured to swivel a caster counterclockwise when the caster traverses the left guide surface in the progressive direction.

A4.3. The floor of any of paragraphs A4-A4.2, wherein the left guide surface is configured to swivel a caster counterclockwise when the caster traverses the left guide surface opposite the progressive direction.

A4.3.1. The floor of paragraph A4.3, wherein the left guide surface is configured to swivel a caster in a wheel-leading configuration counterclockwise when the caster traverses the left guide surface opposite the progressive direction.

A4.4. The floor of any of paragraphs A4-A4.3.1, wherein the right guide surface is configured to direct a caster toward the right edge when the caster traverses the right guide surface in the progressive direction.

A4.5. The floor of any of paragraphs A4-A4.4, wherein the right guide surface is configured to swivel a caster clockwise when the caster traverses the right guide surface in the progressive direction.

A4.6. The floor of any of paragraphs A4-A4.5, wherein the right guide surface is configured to swivel a caster clockwise when the caster traverses the right guide surface opposite the progressive direction.

A4.6.1. The floor of paragraph A4.6, wherein the right guide surface is configured to swivel a caster in a wheel-leading configuration clockwise when the caster traverses the right guide surface opposite the progressive direction.

A4.7. The floor of any of paragraphs A4-A4.6.1, wherein the caster deflector of the left guide surface and/or the caster deflector of the right guide surface has a symmetric profile along the progressive direction of the left guide surface and/or right guide surface respectively.

A4.8. The floor of any of paragraphs A4-A4.6.1, wherein the caster deflector of the left guide surface and/or the caster deflector of the right guide surface has an asymmetric profile along the progressive direction of the left guide surface and/or right guide surface respectively.

A5. The floor of any of paragraphs A1-A4.8, wherein the left guide surface and the right guide surface are at least one of spaced apart, abutting, adjoining, and interleaved.

A6. The floor of any of paragraphs A1-A5, wherein the caster deflector of the left guide surface and/or the caster deflector of the right guide surface are each independently elongated, optionally with a width in an elongated direction of greater than 10 mm, 20 mm, 30 mm, 40 mm, 50 mm, 60 mm, 80 mm, 100 mm, 150 mm, 200 mm, or 500 mm.

A6.1. The floor of paragraph A6, when depending from A4, wherein an/the elongated direction of the caster deflector of the left guide surface is oriented transverse to the progressive direction, optionally wherein an acute angle between the/an elongate direction and the progressive direction is about 50°, 60°, 65°, 70°, 75°, 80°, 85°, or 90°, and/or 45°-90°, 50°-90°, 50°-85°, 60°-80°, or 60°-75°.

A6.2. The floor of any of paragraphs A6-A6.1, when depending from A4, wherein an/the elongated direction of the caster deflector of the right guide surface is oriented transverse to the progressive direction, optionally wherein an acute angle between the/an elongate direction and the progressive direction is about 50°, about 60°, about 65°, about 70°, about 75°, about 80°, about 85°, or about 90°, and/or 45°-90°, 50°-90°, 50°-85°, 60°-80°, or 60°-75°.

A6.3. The floor of any of paragraphs A6-A6.2, wherein the caster deflector of the left guide surface has a symmetric profile perpendicular to the/an elongated direction.

A6.4. The floor of any of paragraphs A6-A6.2, wherein the caster deflector of the left guide surface has an asymmetric profile perpendicular to the/an elongated direction.

A6.5. The floor of any of paragraphs A6-A6.4, wherein the caster deflector of the right guide surface has a symmetric profile perpendicular to the/an elongated direction.

A6.6. The floor of any of paragraphs A6-A6.4, wherein the caster deflector of the right guide surface has an asymmetric profile perpendicular to the/an elongated direction.

A7. The floor of any of paragraphs A1-A6.6, wherein the caster deflector of the left guide surface and/or the caster deflector of the right guide surface are each independently at least one of a ridge, a crest, a strip, a ramp, a bump, a bar, an elongated convexity, a valley, a channel, a groove, a depression, a gap, and an elongated concavity.

A8. The floor of any of paragraphs A1-A7, wherein the caster deflector of the left guide surface and/or the caster deflector of the right guide surface each independently include a change in elevation, optionally of at least 0.5 mm, 1 mm, 2 mm, 3 mm, 4 mm, 5 mm, 6 mm, 8 mm, 10 mm, 15 mm, 20 mm, or 30 mm, and/or less than 150 mm, 100 mm, 50 mm, 40 mm, 30 mm, 20 mm, 10 mm, or 5 mm.

A9. The floor of any of paragraphs A1-A8, wherein the left guide surface includes a plurality of caster deflectors, optionally wherein the plurality of caster deflectors is a series and/or an array of caster deflectors.

A9.1. The floor of paragraph A9, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

A9.2. The floor of any of paragraphs A9-A9.1, wherein the plurality of caster deflectors includes a periodic series of caster deflectors, optionally with a spacing period of about 10 mm, 20 mm, 30 mm, 40 mm, 50 mm, 60 mm, 70 mm, or 80 mm.

A10. The floor of any of paragraphs A1-A9.2, wherein the right guide surface includes a plurality of caster deflectors, optionally wherein the plurality of caster deflectors is a series and/or an array of caster deflectors.

A10.1. The floor of paragraph A10, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

A10.2. The floor of any of paragraphs A10-A10.1, wherein the plurality of caster deflectors includes a periodic series of caster deflectors, optionally with a spacing period of about 10 mm, about 20 mm, about 30 mm, about 40 mm, about 50 mm, about 60 mm, about 70 mm, or about 80 mm.

A11. The floor of any of paragraphs A1-A10.2, wherein the floor further comprises a sound dampening material.

A12. The floor of any of paragraphs A1-A11, wherein the caster deflector of the left guide surface is hollow, includes a void, and/or includes a hollow space.

A13. The floor of any of paragraphs A1-A12, wherein the caster deflector of the right guide surface is hollow, includes a void, and/or includes a hollow space.

A14. The floor of any of paragraphs A1-A13, wherein the caster deflector of the left guide surface is affixed to the floor with adhesive.

A15. The floor of any of paragraphs A1-A14, wherein the caster deflector of the right guide surface is affixed to the floor with adhesive.

A16. A compartment that comprises:
the floor of any of paragraphs A1-A15,
a left wall coupled relative to the floor, and
a right wall coupled relative to the floor,
wherein the left guide surface is proximate the left wall of the compartment, the right guide surface is proximate the right wall of the compartment, the back end region of the floor is proximate a terminus of the compartment and the front end region of the floor is proximate a threshold of the compartment.

A17. An aircraft that comprises one or more floors of any of paragraphs A1-A15, and/or that comprises one or more compartments of paragraph A16.

B1. A cart control system comprising:
a cart with one or more swivel casters;
a floor supporting the cart, wherein the floor includes a guide surface; and
a wall coupled relative to the floor;
wherein the guide surface is proximate the wall and includes a progressive direction substantially parallel to the wall; and
wherein the guide surface is configured to swivel at least one of the swivel casters to be directed toward the wall when the swivel caster traverses the guide surface in the progressive direction.

B2. The cart control system of paragraph B1, wherein the guide surface is configured to swivel outwardly at least one of the swivel casters in a wheel-leading configuration, when the swivel caster traverses the guide surface opposite the progressive direction.

B3. The cart control system of any of paragraphs B1-B2, wherein the guide surface includes a caster deflector.

B3.1. The cart control system of paragraph B3, wherein the caster deflector has a symmetric profile along the progressive direction.

B3.2. The cart control system of paragraph B3, wherein the caster deflector is an asymmetric profile along the progressive direction.

B3.3. The cart control system of any of paragraphs B3-B3.2, wherein the caster deflector is elongated.

B3.3.1. The cart control system of paragraph B3.3, wherein the caster deflector has a length in an elongated direction of greater than 10 mm, 20 mm, 30 mm, 40 mm, 50 mm, 60 mm, 80 mm, 100 mm, 150 mm, 200 mm, or 500 mm.

B3.3.2. The cart control system of any of paragraphs B3.3-B3.3.1, wherein the caster deflector is oriented transverse to the progressive direction, optionally wherein an acute angle between an/the elongated direction and the progressive direction is about 50°, 60°, 65°, 70°, 75°, 80°, 85°, or 90°, and/or 45°-90°, 50°-90°, 50°-85°, 60°-80°, or 60°-75°.

B3.3.3. The cart control system of any of paragraphs B3.3-B3.3.2, wherein the caster deflector has a symmetric profile perpendicular to the/an elongated direction.

B3.3.4. The cart control system of any of paragraphs B3.3-B3.3.2, wherein the caster deflector has an asymmetric profile perpendicular to the/an elongated direction.

B3.4. The cart control system of any of paragraphs B3-B3.3.4, wherein the caster deflector is at least one of a ridge, a crest, a strip, a ramp, a bump, a bar, an elongated convexity, a valley, a channel, a groove, a depression, a gap, and an elongated concavity.

B3.5. The cart control system of any of paragraphs B3-B3.4, wherein the caster deflector includes a change in elevation, optionally of at least 0.5 mm, 1 mm, 2 mm, 3 mm, 4 mm, 5 mm, 6 mm, 8 mm, 10 mm, 15 mm, 20 mm, or 30 mm, and/or less than 150 mm, 100 mm, 50 mm, 40 mm, 30 mm, 20 mm, 10 mm, or 5 mm.

B3.6. The cart control system of any of paragraphs B3-B3.5, wherein the guide surface includes a plurality of caster deflectors, optionally wherein the plurality of caster deflectors is a series and/or an array of caster deflectors.

B3.6.1. The cart control system of paragraph B3.6, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

B3.6.2. The cart control system of any of paragraphs B3.6-B3.6.1, wherein the plurality of caster deflectors include a periodic series of caster deflectors, optionally with a spacing period of about 10 mm, 20 mm, 30 mm, 40 mm, 50 mm, 60 mm, 70 mm, or 80 mm.

B4. The cart control system of any of paragraphs B1-B3.6.2, wherein the floor includes a sound dampening material.

B5. The cart control system of any of paragraphs B1-84, wherein the cart control system comprises a compartment that includes the wall.

B6. The cart control system of any of paragraphs B1-B5, wherein the wall is a left wall and wherein the cart control system comprises a right wall substantially parallel to the left wall.

B6.1. The cart control system of paragraph B6, wherein the guide surface is a left guide surface and wherein the cart control system comprises a right guide surface on the floor proximate the right wall, and optionally wherein the floor is the floor of any of paragraphs A1-A15.

B7. An aircraft comprising one or more cart control systems of any of paragraphs B1-B6.1.

C1. A method of controlling a direction of a caster of a cart near a wall, the method comprising:
  first, moving the cart in a first direction along a length of the wall, wherein the moving in the first direction includes swiveling the caster of the cart in a swivel direction to be directed toward the wall by traversing a guide surface along a progressive direction of the guide surface; and
  second, moving the cart in a second direction, opposite the first direction, along the length of the wall, wherein the moving in the second direction includes swiveling the caster in the swivel direction, optionally by traversing the guide surface opposite the progressive direction.

C2. The method of paragraph C1, wherein the moving in the first direction includes moving the cart along the progressive direction.

C3. The method of any of paragraphs C1-C2, wherein the moving in the second direction includes moving the cart opposite the progressive direction.

C4. The method of any of paragraphs C1-C3, wherein the guide surface includes a caster deflector.

C4.1. The method of paragraph C4, wherein the caster deflector is symmetric along the progressive direction.

C4.2. The method of paragraph C4, wherein the caster deflector is asymmetric along the progressive direction.

C4.3. The method of any of paragraphs C4-C4.2, wherein the caster deflector is elongated in an elongated direction.

C4.3.1. The method of paragraph C4.3, wherein the caster deflector has a length in the elongated direction of greater than 10 mm, 20 mm, 30 mm, 40 mm, 50 mm, 60 mm, 80 mm, 100 mm, 150 mm, 200 mm, or 500 mm.

C4.3.2. The method of any of paragraphs C4.3-C4.3.1, wherein the caster deflector is oriented transverse to the progressive direction, optionally wherein an acute angle between the elongated direction and the progressive direction is about 50°, 60°, 65°, 70°, 75°, 80°, 85°, or 90°, and/or 45°-90°, 50°-90°, 50°-85°, 60°-80°, or 60°-75°.

C4.4. The method of any of paragraphs C4-C4.3.2, wherein the caster deflector is at least one of a ridge, a crest, a strip, a ramp, a bump, a bar, an elongated convexity, a valley, a channel, a groove, a depression, a gap, and an elongated concavity.

C4.5. The method of any of paragraphs C4-C4.4, wherein the caster deflector includes a change in elevation, optionally of at least 0.5 mm, 1 mm, 2 mm, 3 mm, 4 mm, 5 mm, 6 mm, 8 mm, 10 mm, 15 mm, 20 mm, or 30 mm, and/or less than 150 mm, 100 mm, 50 mm, 40 mm, 30 mm, 20 mm, 10 mm, or 5 mm.

C4.6. The method of any of paragraphs C4-C4.5, wherein the guide surface includes a plurality of caster deflectors, optionally wherein the plurality of caster deflectors is a series and/or an array of caster deflectors.

C4.6.1. The method of paragraph C4.6, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

C4.6.2. The method of any of paragraphs C4.6-C4.6.1, wherein the plurality of caster deflectors includes a periodic series of caster deflectors, optionally with a spacing period of about 10 mm, 20 mm, 30 mm, 40 mm, 50 mm, 60 mm, 70 mm, or 80 mm.

C5. The method of any of paragraphs C1-C4.6.2, wherein the method comprises coordinated control of at least two casters on one side of the cart proximate the wall.

C5.1. The method of paragraph C5, wherein the moving in the first direction includes swiveling each caster in the swivel direction by traversing the guide surface along the progressive direction.

C5.2. The method of any of paragraphs C5-05.1, wherein the moving in the second direction includes swiveling each caster in the swivel direction, optionally by traversing the guide surface opposite the progressive direction.

C6. The method of any of paragraphs C1-05.2, wherein the method comprises coordinated control of at least two casters on opposite sides of the cart, wherein the caster is a left caster, the wall is a left wall, and the guide surface is a left guide surface, wherein the at least two casters includes the left caster and a right caster, and wherein the moving the cart in the first direction includes moving along a length of a right wall while moving along the length of the left wall.

C6.1. The method of paragraph C6, wherein the moving in the first direction includes swiveling the left caster counterclockwise to be directed toward the left wall by traversing the left guide surface in the progressive direction and swiveling the right caster clockwise to be directed toward the right wall by traversing a right guide surface along the progressive direction.

C6.2. The method of any of paragraphs C6-C6.1, wherein the moving in the second direction includes swiveling the left caster counterclockwise and the right caster clockwise, optionally by traversing, opposite the progressive direction, the left guide surface with the left caster and by traversing, opposite the progressive direction, the right guide surface with the right caster.

C7. The method of any of paragraphs C1-C6.2, wherein the moving in the first direction and/or the moving in the second direction include suppressing sound and vibration associated with the moving in the first direction and/or the moving in the second direction respectively.

C8. The method of any of paragraphs C1-C7, wherein the guide surface is the guide surface of the floor of any of paragraphs A1-A15.

C9. The method of any of paragraphs C1-C8, wherein the cart is the cart of the control system of any of paragraphs 131-B6.1.

C10. The method of any of paragraphs C1-C9, wherein the guide surface is the guide surface of the control system of any of paragraphs B1-B6.1.

D1. A method of stowing a cart with a left swivel caster and a right swivel caster in a compartment that is narrower than the cart with the left swivel caster extended to the left and the right swivel caster extended to the right, the method comprising:
inserting the cart into the compartment while swiveling the left caster counterclockwise to be directed left and the right caster clockwise to be directed right; and
removing the cart from the compartment by swiveling the left caster counterclockwise and the right caster clockwise to reach a stable wheel-following configuration.

D2. The method of paragraph D1, wherein the inserting includes traversing a left guide surface to swivel the left caster counterclockwise and traversing a right guide surface to swivel the right caster clockwise.

D3. The method of any of paragraphs D1-D2, wherein the removing includes traversing a left guide surface to swivel the left caster counterclockwise and traversing a right guide surface to swivel the right caster clockwise.

D3.1. The method of any of paragraphs D2-D3, wherein the left guide surface and/or the right guide surface has a progressive direction pointing from a threshold of the compartment to a terminus of the compartment.

D3.2. The method of any of paragraphs D2-D3.1, wherein the left guide surface and the right guide surface is at least one of spaced apart, abutting, adjoining, and interleaved.

D3.3. The method of any of paragraphs D2-D3.2, wherein the left guide surface and/or the right guide surface includes a caster deflector.

D3.3.1. The method of paragraph D3.3, wherein the caster deflector of the left guide surface and/or the caster deflector of the right guide surface are each independently elongated, optionally with a length in an elongated direction of greater than 10 mm, 20 mm, 30 mm, 40 mm, 50 mm, 60 mm, 80 mm, 100 mm, 150 mm, 200 mm, or 500 mm.

D3.3.2. The method of any of paragraphs D3.3-D3.3.1, when depending from D3.1, wherein an/the elongated direction of the caster deflector of the left guide surface is oriented transverse to the progressive direction of the left guide surface, optionally wherein an acute angle between the elongate direction and the progressive direction is about 50°, 60°, 65°, 70°, 75°, 80°, 85°, or 90°, and/or 45°-90°, 50°-90°, 50°-85°, 60°-80°, or 60°-75°.

D3.3.3. The method of any of paragraphs D3.3-D3.3.2, when depending from D3.1, wherein an/the elongated direction of the caster deflector of the right guide surface is oriented transverse to the progressive direction of the right guide surface, optionally wherein an acute angle between the elongate direction and the progressive direction is about 50°, 60°, 65°, 70°, 75°, 80°, 85°, or 90°, and/or 45°-90°, 50°-90°, 50°-85°, 60°-80°, or 60°-75°.

D3.3.4. The method of any of paragraphs D3.3-D3.3.3, wherein the caster deflector of the left guide surface and/or the caster deflector of the right guide surface are each independently at least one of a ridge, a crest, a strip, a ramp, a bump, a bar, an elongated convexity, a valley, a channel, a groove, a depression, a gap, and an elongated concavity.

D3.3.5. The method of any of paragraphs D3.3-D3.3.4, wherein the caster deflector of the left guide surface and/or the caster deflector of the right guide surface each independently include a change in elevation, optionally of at least 0.5 mm, 1 mm, 2 mm, 3 mm, 4 mm, 5 mm, 6 mm, 8 mm, 10 mm, 15 mm, 20 mm, or 30 mm, and/or less than 150 mm, 100 mm, 50 mm, 40 mm, 30 mm, 20 mm, 10 mm, or 5 mm.

D3.4. The method of any of paragraphs D3-D3.3.5, wherein the left guide surface includes a plurality of caster deflectors, optionally wherein the plurality of caster deflectors is a series and/or an array of caster deflectors.

D3.4.1. The method of paragraph D3.4, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

D3.4.2. The method of any of paragraphs D3.4-D3.4.1, wherein the plurality of caster deflectors includes a periodic series of caster deflectors, optionally with a spacing period of about 10 mm, 20 mm, 30 mm, 40 mm, 50 mm, 60 mm, 70 mm, or 80 mm.

D3.5. The method of any of paragraphs D3-D3.4.2, wherein the right guide surface includes a plurality of caster deflectors, optionally wherein the plurality of caster deflectors is a series and/or an array of caster deflectors.

D3.5.1. The method of paragraph D3.5, wherein a spacing between two of the plurality of caster deflectors is at least 5 mm, 10 mm, 20 mm, or 40 mm, and/or less than 150 mm, 100 mm, 80 mm, 60 mm, 40 mm, 20 mm, or 10 mm.

D3.5.2. The method of any of paragraphs D3.5-D3.5.1, wherein the plurality of caster deflectors includes a periodic series of caster deflectors, optionally with a spacing period of about 10 mm, 20 mm, 30 mm, 40 mm, 50 mm, 60 mm, 70 mm, or 80 mm.

D4. The method of any of paragraphs D1-D3.5.2, wherein the compartment includes a left wall and a right wall, and wherein the inserting includes swiveling the left caster counterclockwise to be directed left near the left wall and swiveling the right caster clockwise to be directed right near the right wall.

D5. The method of any of paragraphs D1-D4, wherein the inserting includes securing the cart in the compartment.

D6. The method of any of paragraphs D1-D5, wherein the removing includes releasing the cart from the compartment.

D7. The method of any of paragraphs D1-D6, wherein the inserting and/or the removing includes suppressing sound and vibration associated with the inserting and/or the removing respectively.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of stowing a cart with a left swivel caster and a right swivel caster in a compartment that is narrower than the cart with the left swivel caster extended to the left and the right swivel caster extended to the right, the method comprising:
    inserting the cart into the compartment while swiveling the left swivel caster counterclockwise to be directed left and the right swivel caster clockwise to be directed right; and
    removing the cart from the compartment by swiveling the left swivel caster counterclockwise and the right swivel caster clockwise to reach a stable wheel-following configuration.

2. The method of claim 1, wherein the inserting includes traversing a left guide surface to swivel the left swivel caster counterclockwise and traversing a right guide surface to swivel the right swivel caster clockwise.

3. The method of claim 2, wherein the left guide surface includes a caster deflector and the right guide surface includes a caster deflector.

4. The method of claim 3, wherein the caster deflector of the left guide surface and the caster deflector of the right guide surface are elongated.

5. The method of claim 3, wherein the caster deflector of the left guide surface and the caster deflector of the right guide surface are each independently at least one of a ridge, a crest, a strip, a ramp, a bump, a bar, an elongated convexity, a valley, a channel, a groove, a depression, a gap, and an elongated concavity.

6. The method of claim 3, wherein the caster deflector of the left guide surface and the caster deflector of the right guide surface each independently includes a change in elevation of at least 1 mm and less than 10 mm.

7. The method of claim 3, wherein the left guide surface includes a plurality of caster deflectors and the right guide surface includes a plurality of caster deflectors.

8. The method of claim 1, wherein the removing includes traversing a left guide surface to swivel the left swivel caster counterclockwise and traversing a right guide surface to swivel the right swivel caster clockwise.

9. The method of claim 1, wherein the inserting includes securing the cart in the compartment, and wherein the removing includes releasing the cart from the compartment.

10. A method of controlling a direction of a swivel caster of a cart near a wall, the method comprising:
    first, moving the cart in a first direction along a length of the wall, wherein the moving in the first direction includes swiveling the swivel caster of the cart in a swivel direction to be directed toward the wall by traversing a guide surface along a progressive direction of the guide surface; and
    second, moving the cart in a second direction, opposite the first direction, along the length of the wall, wherein the moving in the second direction includes swiveling the swivel caster in the swivel direction by traversing the guide surface opposite the progressive direction.

11. The method of claim 10, wherein the guide surface includes a caster deflector.

12. The method of claim 11, wherein the caster deflector is at least one of a ridge, a crest, a strip, a ramp, a bump, a bar, an elongated convexity, a valley, a channel, a groove, a depression, a gap, and an elongated concavity.

13. The method of claim 11, wherein the guide surface includes a periodic series of caster deflectors.

14. The method of claim 11, wherein the caster deflector is elongated in an elongated direction.

15. The method of claim 14, wherein the caster deflector has a length in the elongated direction of greater than 100 mm.

16. The method of claim 14, wherein the caster deflector is oriented transverse to the progressive direction, wherein an acute angle between the elongated direction and the progressive direction is 60°-80°.

17. The method of claim 10, wherein the method comprises coordinated control of at least two swivel casters on opposite sides of the cart, wherein the swivel caster is a left swivel caster, the wall is a left wall, and the guide surface is a left guide surface, wherein the at least two swivel casters includes the left swivel caster and a right swivel caster, and wherein the moving the cart in the first direction includes moving along a length of a right wall while moving along the length of the left wall.

18. The method of claim 17, wherein the moving in the first direction includes swiveling the left swivel caster counterclockwise to be directed toward the left wall by traversing the left guide surface in the progressive direction and swiveling the right swivel caster clockwise to be directed toward the right wall by traversing a right guide surface along the progressive direction, and wherein the moving in the second direction includes swiveling the left swivel caster counterclockwise by traversing, opposite the progressive direction, the left guide surface and the right swivel caster clockwise by traversing, opposite the progressive direction, the right guide surface with the right swivel caster.

19. A cart control system comprising:
    a cart with one or more swivel casters;
    a floor supporting the cart, wherein the floor includes a guide surface; and
    a wall coupled relative to the floor;
    wherein the guide surface is proximate the wall, includes a progressive direction substantially parallel to the wall, and includes an elongated caster deflector;
    wherein the guide surface is configured to swivel at least one of the swivel casters to be directed toward the wall when the swivel caster traverses the guide surface in the progressive direction; and
    wherein the caster deflector has an elongated direction that is oriented transverse to the progressive direction, wherein an acute angle between the elongated direction and the progressive direction is 60°-80°.

20. The cart control system of claim 19, wherein the wall is a left wall, the guide surface is a left guide surface, and the caster deflector is a left caster deflector;

wherein the one or more swivel casters includes a left swivel caster and a right swivel caster;

wherein the cart control system further comprises a right wall substantially parallel to the left wall and coupled relative to the floor;

wherein the floor includes a right guide surface that is proximate the right wall, includes a progressive direction substantially parallel to the right wall, and includes an elongated caster deflector;

wherein the left guide surface is configured to swivel the left swivel caster counterclockwise to be directed toward the left wall when the left swivel caster traverses the left guide surface in the progressive direction of the left guide surface;

wherein the right guide surface is configured to swivel the right swivel caster clockwise to be directed toward the right wall when the right swivel caster traverses the right guide surface in the progressive direction of the right guide surface; and wherein the right caster deflector has an elongated direction that is oriented transverse to the progressive direction of the right guide surface, wherein an acute angle between the elongated direction of the right caster deflector and the progressive direction of the right guide surface is 60°-80°.

\* \* \* \* \*